United States Patent [19]

Brennan

[11] Patent Number: 4,498,820
[45] Date of Patent: Feb. 12, 1985

[54] CUTTING TOOL

[75] Inventor: Albert T. Brennan, Sherborn, Mass.

[73] Assignee: SMA Controls Inc., Medfield, Mass.

[21] Appl. No.: 409,012

[22] Filed: Aug. 17, 1982

[51] Int. Cl.³ .............................................. B23B 5/16
[52] U.S. Cl. ...................................... 409/179; 82/1.2; 82/4 C; 408/82
[58] Field of Search ...................... 408/79, 80, 81, 82, 408/111; 82/4 C, 2 E, 1.2; 409/175, 178, 179

[56] References Cited

U.S. PATENT DOCUMENTS

| | | | |
|---|---|---|---|
| 1,972,022 | 8/1934 | Le May | 408/111 X |
| 2,040,273 | 5/1936 | Rohler | 408/111 |
| 2,181,450 | 11/1939 | Davenport | 82/4 R |
| 2,409,158 | 10/1946 | Simpson et al. | 82/4 R |
| 3,051,059 | 8/1962 | Davey | 82/4 C X |
| 3,228,268 | 1/1966 | Strout | 77/73 |
| 3,330,366 | 7/1967 | Lowry et al. | 173/33 |
| 3,717,055 | 2/1973 | Pendleton | 82/4 C |
| 3,835,738 | 9/1974 | Kellum et al. | 82/4 C |
| 3,951,018 | 4/1976 | Gilmore | 82/4 C |
| 3,982,451 | 9/1976 | Gilmore | 82/4 C |
| 4,149,436 | 4/1979 | Blahler | 82/4 C |

FOREIGN PATENT DOCUMENTS 2092934  8/1982  United Kingdom .................. 82/4 C Primary Examiner—William R. Briggs
Assistant Examiner—Glenn L. Webb

[57] ABSTRACT

A portable tube end cutting tool includes a tool support shaft with an alignment assembly at one end for insertion into the tube whose end surface is to be machined and a cutter head assembly mounted for rotation about the support shaft. The tool portion to be inserted into the tube space adjacent the tube end to be machined is compact and is adapted to be locked in accurate alignment by incremental rotation of the support shaft over small angular increments, and is particularly useful where the tube surfaces to be machined are located in confined or relatively inaccessible working places.

9 Claims, 4 Drawing Figures

CUTTING TOOL

This invention relates to portable cutting tools and more particularly to portable cutting tools particularly adapted for preparing end surfaces of metal tubing and the like for further processing such as rewelding.

In the repair of tubing installations such as portions of boiler tube banks, for example, it is necessary to cut away defective sections of tubes and provide neat and accurate bevel surfaces for welding replacement tube sections. Portable cutting tools for such purposes are disclosed in U.S. Pat. Nos. 3,228,268 and 3,330,366. The tools disclosed in those patents have clamp structures for aligning the cutting tool with the tube to be machined. Frequently, however, defective tube sections are located in relatively inaccessible spaces, and the cutting tools heretofore available can be used in such spaces only with great difficulty if at all.

In accordance with the invention, there is provided a portable tube end cutting tool that includes a tool support shaft with an alignment assembly at one end for insertion into the tube whose end surface is to be machined, a cutter head assembly mounted for rotation about the axis of the support shaft, a first drive for moving the cutter head assembly axially relative to the shaft, a second drive for driving the cutter head assembly in rotation that includes a gear housing and a drive motor whose axis is parallel to but offset from the shaft axis, and an actuation mechanism for the alignment assembly that includes an asymmetrical drive mechanism coupled between the gear housing and the support shaft for rotating the support shaft in a predetermined direction to actuate the alignment assembly while allowing reset of the asymmetrical drive mechanism without movement of the support shaft in the opposite direction. The tool has a compact portion adapted to be inserted into the tube space adjacent the tube end to be machined and locked in accurate alignment by incremental rotation of the support shaft over small angular increments, and is particularly useful where the tube surfaces to be machined are located in confined or relatively inaccessible working places.

In a particular embodiment, the asymmetrical shaft drive mechanism includes a toothed ratchet disc fixed to the support shaft and a selector member carried by the gear housing that has two latch portions arranged for alternate engagement with the teeth of the ratchet disc. A biasing arrangement includes two cam surfaces formed in the selector member and a resiliently biased follower that biases one selector latch portion into driving engagement with teeth on the ratchet disc. The rotary drive mechanism for the cutting head assembly includes an air motor, and the end of the support shaft opposite the alignment assembly has a drive structure formed thereon for receiving an auxiliary drive member where such is desirable for either locking or releasing the alignment assembly. The alignment assembly includes a collet structure with an array of axially extending flexible leaves and a head, the collet structure being carried by a threaded section of the support shaft. An adjacent camming portion on the support shaft is arranged to cam the flexible leaves outwardly into gripping engagement with the inner surface of the tube to be machined.

Other features and advantages of the invention will be seen as the following description of a particular embodiment progresses, in conjunction with the drawings, in which.

DESCRIPTION OF PARTICULAR EMBODIMENT

Figure 1:
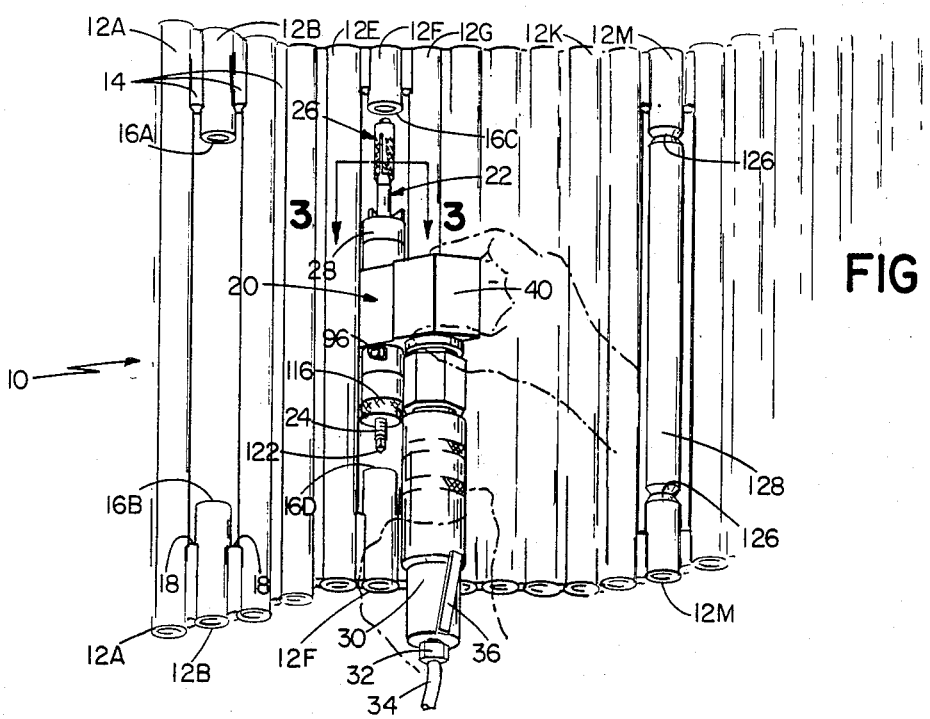
FIG. 1 is a perspective view of a water wall tube bank with three defective tube sections removed, a cutting tool in accordance with the invention disposed in the space where one of the defective tube sections has been removed; and a replacement tube section in another space.

With reference to FIG. 1, there is shown a portion of a bank 10 of water wall tubes 12 with interconnecting fillets 14. A portion of tube 12B has been cut out leaving rough end surfaces 16A, 16B, and portions of the fillets 14 have been cut back. Similar portions of tubes 12F and 12M and adjacent fillets also have been removed. The space between tube ends 16A, 16B may be as small as one and one half inches wide and twelve inches long.

The end prep tool 20 disposed in the space between tube ends 16C, 16D has a support shaft 22 with a threaded section 24 at one end and an alignment assembly 26 at the other end. A cutter head 28 is mounted on shaft 22 and is driven by air motor 30 that is connected to a source of air under pressure via coupling 32 and line 34. Operation of motor 30 is controlled by lever 36. The axis of motor 30 is parallel to and offset from shaft 30 and connected to drive cutter head 28 by a gear train in gear housing 40.

Figure 2:
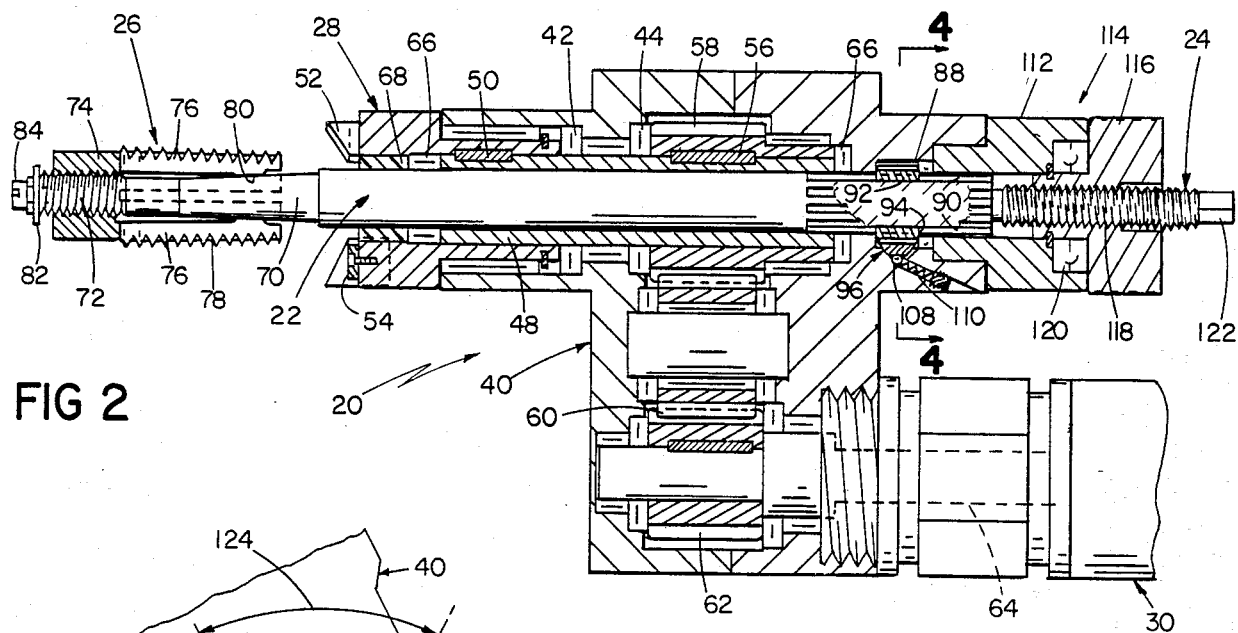
FIG. 2 is a cross-sectional view of the cutting tool shown in FIG. 1.
Figure 3:
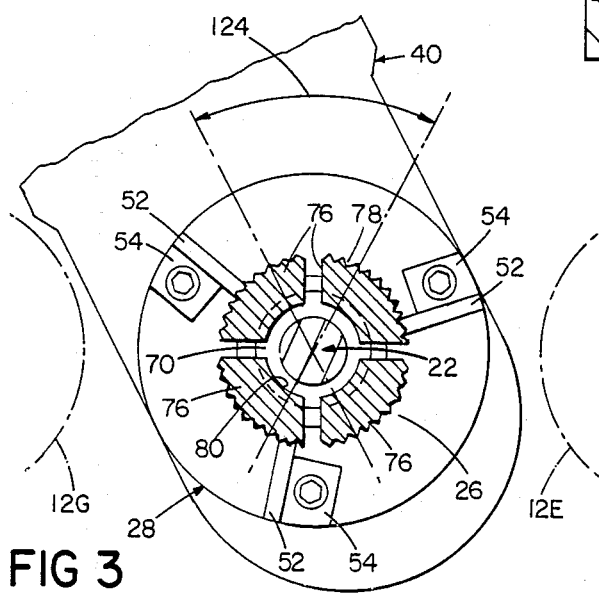
FIG. 3 is a sectional view through the alignment assembly of the cutting tool of FIG. 1 taken along the line 3—3 of FIG. 1.

Further details of the end prep tool may be seen with reference to FIG. 2. Bearings 42, 44 within housing assembly 40 support drive sleeve 48 on which cutter head 28 is received for driving by key 50 Seal 68 is positioned between cutter head 28 and shaft 22. Mounted on cutter head 28 are a set of cutter blades 52 that are secured in position by lock bolts 54 (as shown in FIGS. 2 and 3). The precise number and form of cutter tools 52 may be varied depending on the particular cutting tool application and may include beveling, chamfering, and edge facing tools, the blades 52 or the cutter head 28 being readily changed as appropriate for the particular work piece to be machined.

Secured to drive sleeve 48 by key 56 is drive gear 58 which meshes with idler gear 60, which in turn meshes with gear 62 that is coupled to drive shaft 64 of air motor 30, gears 60 and 62 being disposed in housing 40.

Support shaft 22 is supported by bearings 66, and has a tapered section 70 and a threaded section 72 at one end which receive expansion collet 26. That expansion collet includes an internally threaded cylindrical portion 74 that is attached to threaded section 72 of shaft 22 and axially extending leaves 76 that have external knurled gripping surfaces 78 and tapered inner surfaces 80 that seat on shaft section 70. Collet retaining disc 82 is secured with screw 84. In this embodiment, collet 26 has a length of about three inches and an outer diameter of about $\frac{7}{8}$ inch for use in machining end surfaces of tubes with an inner diameter of $\frac{7}{8}$ inch.

Figure 4:
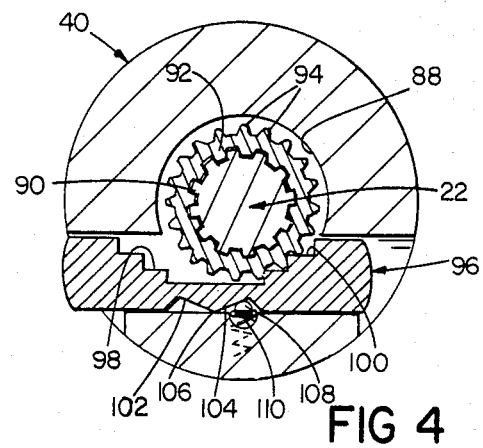
FIG. 4 is a sectional view through the asymmetrical shaft drive mechanism taken along the line 4—4 of FIG. 2.

A rotary drive mechanism 86 for shaft 22 is housed in compartment 88 of housing 40. The drive mechanism 86 is coupled to shaft 22 by a splined section 90 of shaft 22, and, as shown in FIGS. 2 and 4, includes ratchet disc 92 that is fixed to shaft 22 by spline 90 and that has a series of ratchet teeth 94 that extend about its outer periphery. Selector rod 96 is mounted for sliding lateral movement through compartment 88 and includes two sets of drive surfaces 98, 100 arranged for alternate engagement with ratchet teeth 94. Formed in the lower surface of rod 96 are toggle cam surfaces 102, 104 on either side of crest 106. Spherical follower 108 is biased by spring 110 into engagement with cam surface 102 or 104, depending on the position of selector rod 96. Rod 96 is secured for limited sliding movement between a first position, as shown in FIG. 4, in which tooth set 100 is in engagement with ratchet teeth 94 and a second position in which rod 96 is slid over center (past crest 106) so that tooth set 98 is in engagement with ratchet teeth 94. In the first position of selector rod 96, the drive mechanism is operative to rotate shaft 22 only in the clockwise direction (as viewed in FIG. 4), and in the second position, the drive mechanism rotate shaft 22 only in the counterclockwise direction.

Attached to the housing 40 is a cylindrical drive coupling 112 of axial shaft drive assembly 114. That assembly includes manual drive member 116 that has an internal threaded portion 118 in engagement with a helical thread 24 formed in shaft 22 and that carries bearing 120 that is seated in an end recess of coupling 112. Rotation of drive member 116 moves support shaft 22 axially relative to housing 40 and cutter head 28. Formed at the exposed outer end of shaft 22 is an auxiliary drive coupling 122 which is adapted to receive an auxiliary drive member for rotating shaft 22.

In use, after air line 34 is connected to air motor 30 by coupling 32, the alignment assembly 26 is inserted into the bore of tube 12F whose end surface 16C is to be beveled for rewelding. With alignment collet 26 inserted into the bore of tube 12F, and with control rod 96 set for collet engagement, the housing 40 of the tool is incrementally rotated (as indicated at 124 in FIG. 3) to rotate shaft 22 and drive collet 26 along that shaft so that the collet leaves 76 expand outwardly as driven by tapered section 70 and firmly grip the bore of tube 12F to provide stable tool support and alignment of cutter head 28 relative to the tube end surface to be machined. The gripping action of the alignment assembly 26 is obtained by incremental angular movement of housing 40 in the drive direction, which advances collet leaves 76 along cam surface 70, forcing them outwardly against the inner surface of tube 12F the ratchet mechanism allowing rotation of housing 40 in the opposite direction without release of the purchase of collet surfaces 78 on the bore of tube 12F.

With tool 20 firmly secured to and aligned with tube 12F, manual drive 116 is rotated to advance blades 52 of the cutter head assembly 28 into engagement with the tube end surface 16C to be machined and air motor 30 is energized to drive the cutter blades 52 in a machining operation, for example to provide a neat and accurate bevel 126 for rewelding. When the machining operation is completed, the air motor control 36 is released, drive 116 is backed off to space the cutter blades 52 from the machined end surface 16C, control lever 96 is moved to its opposite position, and housing 40 is again moved in angular increments as limited by adjacent tubes 12E, 12G to release the gripping action of alignment assmbly 26 so that tool 20 may be removed from tube 12F. Should additional leverage be required to rotate shaft 22 to engage or release the alignment assembly 26, an auxiliary lever may be attached to shaft end 122. Tool 20 is then inverted to similarly machine the opposite end surface 16D. A replacement tube section 128 with similar beveled ends is then inserted into the space and welded in place, as indicated at tube 12M in FIG. 1.

When a tube of another internal diameter is to be machined, a different alignment assembly 26 of appropriate diameter is threaded on shaft 22, that alignment assembly having leaves 76 that closely correspond with the internal diameter of the tube to be machined. Similarly, different arrays of cutting tools 52 may be attached to cutter head 28 to provide boring, facing, chamfering and like cutting actions.

The invention thus provides a compact, portable cutting tool for machining end surfaces of tubes and the like with an alignment assembly and actuation mechanism that is operated by simple incremental angular rotation of the tool housing about the shaft axis. While a particular embodiment of the invention has been shown and described, various modifications will be apparent to those skilled in the art, and therefore it is not intended that the invention be limited to the disclosed embodiment or to details thereof, and departures may be made therefrom within the spirit and scope of the invention.

What is claimed is:

1. A portable tube end cutting tool comprising a tool support shaft with an alignment assembly at one end for insertion into the tube whose end surface is to be machined, ratchet structure fixed to said support shaft,
   a cutter head assembly mounted for rotation about the axis of said support shaft,
   a first drive for moving said cutter head assembly axially relative to said shaft, a second drive for driving said cutter head assembly in rotation, and
   an actuation mechanism for said alignment assembly that includes an asymmetrical drive mechanism that includes selector structure with latch portions arranged for alternate engagement with said ratchet structure for rotating said support shaft in a predetermined direction to actuate said alignment assembly while allowing reset of said asymmetrical drive mechanism without movement of said support shaft in the opposite direction.

2. The tool of claim 1 wherein said alignment assembly includes a collet structure with an array of axially extending flexible leaves and a head, said collet structure being carried by a threaded section of said support shaft, and said support shaft has an adjacent camming portion arranged to cam said flexible leaves outwardly into gripping engagement with the inner surface of the tube to be machined.

3. The tool of claim 1 wherein said asymmetrical shaft drive mechanism further includes a biasing arrangement that includes two cam surfaces formed in said selector structure and a resiliently biased follower that cooperates with said cam surfaces to selectively bias one of said selector latch portions into driving engagement with teeth on said ratchet structure.

4. The tool of claim 1 wherein said rotary drive mechanism for said cutting head assembly includes an air motor.

5. The tool of claim 1 wherein the end of said support shaft opposite said alignment assembly had a drive structure formed thereon for receiving an auxiliary drive member for either locking or releasing said alignment assembly.

6. The tool of claim 1 wherein said second drive includes a gear housing and a drive motor whose axis is parallel to but offset from said shaft axis and said asymmetrical drive mechanism is coupled between said gear housing and said support shaft.

7. A portable tube end cutting tool comprising a tool support shaft with an alignment assembly at one end for insertion into the tube whose end surface is to be machined, said shaft having a threaded section at the end opposite said alignment assembly,
  a cutter head assembly mounted for rotation about the axis of said support shaft,
  a first drive cooperating with said threaded section for moving said cutter head assembly axially relative to said shaft, a second drive for driving said cutter head assembly in rotation, said second drive including a gear housing and a drive motor whose axis is parallel to but offset from said shaft axis, and
  an actuation mechanism for said alignment assembly that includes an asymmetrical drive mechanism coupled between said gear housing and said support shaft for rotating said support shaft in a predetermined direction to actuate said alignment assembly while allowing reset of said asymmetrical drive mechanism without movement of said support shaft in the opposite direction, the coupling of said asymmetrical drive mechanism between said gear housing and said support shaft including a spline, and said cutter head assembly including a sleeve that is mounted for rotation about said support shaft and is located within said gear housing between said spline and said alignment assembly.

8. The tool of claim 7 wherein said asymmetrical shaft drive mechanism includes a toothed ratchet disc fixed to said support shaft and a selector member carried by said gear housing that has two latch portions arranged for alternate engagement with the teeth of said ratchet disc.

9. The tool of claim 7 wherein said alignment assembly includes a collet structure with an array of axially extending flexible leaves and a head, said collet structure being carried by a threaded section of said support shaft, and said support shaft has an adjacent camming portion arranged to cam said flexible leaves outwardly into gripping engagement with the inner surface of the tube to be machined.

* * * * *